US012158716B2

(12) United States Patent
Takemasa

(10) Patent No.: US 12,158,716 B2
(45) Date of Patent: Dec. 3, 2024

(54) FIXING DEVICE AND IMAGE FORMING APPARATUS

(71) Applicant: CANON KABUSHIKI KAISHA, Tokyo (JP)

(72) Inventor: Rikiya Takemasa, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/472,753

(22) Filed: Sep. 22, 2023

(65) Prior Publication Data

US 2024/0103417 A1 Mar. 28, 2024

(30) Foreign Application Priority Data

Sep. 28, 2022 (JP) ................................ 2022-154395

(51) Int. Cl.
*G03G 15/20* (2006.01)

(52) U.S. Cl.
CPC ..... *G03G 15/2053* (2013.01); *G03G 15/2064* (2013.01); *G03G 15/2032* (2013.01); *G03G 2215/2032* (2013.01)

(58) Field of Classification Search
CPC ........... G03G 15/2032; G03G 15/2035; G03G 15/2053; G03G 15/2064; G03G 2215/2032
See application file for complete search history.

(56) References Cited

U.S. PATENT DOCUMENTS

2013/0004192 A1* 1/2013 Kawakami ......... G03G 15/2039 399/328
2013/0336686 A1* 12/2013 Yamamoto ......... G03G 15/2028 399/323
2020/0159152 A1* 5/2020 Ohta .................... G03G 15/206

FOREIGN PATENT DOCUMENTS

JP S63002970 U 1/1988
JP H07092846 A 4/1995
JP H0844236 A 2/1996
JP 2013011686 A 1/2013

* cited by examiner

*Primary Examiner* — Hoang X Ngo
(74) *Attorney, Agent, or Firm* — Canon U.S.A., Inc. IP Division

(57) ABSTRACT

A fixing device includes first and second rotary members to form a nip portion, a heating unit, a frame, a bearing member, a moving mechanism, and a restricting member. At the nip portion, the first and second rotary members apply heat and pressure to fix a toner image to a recording material. The moving mechanism moves the second rotary member between a contact position where the first and second rotary members contact to form the nip portion and a separated position where the first and second rotary members are separated from each other. The restricting member includes a restricting portion to restrict the movement of the second rotary member toward the first rotary member. When the first rotary member is supported by the frame and the second rotary member is at the separated position, the restricting member is attachable and detachable between the bearing member and the frame.

8 Claims, 13 Drawing Sheets

VIEW SEEN FROM ARROW S

VIEW SEEN FROM ARROW R

VIEW SEEN FROM ARROW V

FIXING DEVICE AND IMAGE FORMING APPARATUS

BACKGROUND

Field

The present disclosure relates to an image forming apparatus that forms a toner image on a recording material, and a fixing device that fixes the toner image to the recording material.

Description of the Related Art

An image forming apparatus includes an image forming unit that forms a toner image on a recording material, and a conventional fixing device that fixes the formed toner image to the recording material. The fixing device includes a pair of rotary members, and the pair of rotary members forms a fixing nip portion. At the nip portion, the pair of rotary members conveys the recording material bearing the toner image while applying heat and pressure to the recording material. One of the pair of rotary members is a heating rotary member and the other is a pressing rotary member. As the heating rotary member, a roller or an endless belt has conventionally been used. As the pressing rotary member, a roller or an endless belt has conventionally been used.

In the fixing device described above, the nip portion is formed by strong pressure. If the nip portion is left formed for a long time, there is a possibility that the heating rotary member and the pressing rotary member may be deformed. To avoid this issue, a mechanism for releasing the pressure applied to the nip portion (or reducing the pressure to a level lower than that in the fixing process) is generally provided to prevent pressure from being applied to the nip portion except when necessary, thereby preventing the deformation of the heating rotary member and the pressing rotary member.

In a case where the fixing device is to be shipped as a product, the pair of rotary members is put into a state of being separated from each other to suppress the deformation because no image formation is performed during the shipment. While the fixing device is transported from a manufacturer to a user in this separated state, the fixing device is exposed to vibrations for a long time due to movements on roads (such as those made of asphalt) with differences in level. The vibrations may cause the pressing rotary member in the separated state to move and come into contact with the heating rotary member, resulting in a flaw in the heating rotary member.

Japanese Patent Application Laid-Open No. H08-44236 discusses a bearing presser which is a rod-shaped elastic member and is detachably engaged with a bearing at an end portion of the pressing rotary member. The bearing presser fixes the bearing by being supported by a frame holding the bearing. As a result, vibrations of the pressing rotary member during the transportation are suppressed.

Under some circumstances, the roller that has conventionally been used as the heating rotary member or a heating unit needs to undergo a process of temporarily being removed to put the conventional fixing device into a state capable of performing the fixing process. This raises a demand for improvements in workability.

SUMMARY

The present disclosure is directed to improving workability in attaching and detaching a member that prevents a fixing member from being damaged due to a collision.

According to an aspect of the present disclosure, a fixing device includes a heating unit configured to heat a recording material and including a first rotary member, a second rotary member configured to rotate and to come into contact with the first rotary member to form a nip portion, wherein, at the nip portion and together with the first rotary member, the second rotary member applies heat and pressure to the recording material bearing a toner image to fix the toner image to the recording material, a frame supporting each end portion of the heating unit and configured to support the first rotary member, a bearing member attached to each end portion of the second rotary member and supported by the frame so as to rotatably support the second rotary member, a moving mechanism configured to move the second rotary member between a contact position at which the first rotary member and the second rotary member are in contact with each other and form the nip portion and a separated position at which the first rotary member and the second rotary member are separated from each other, and a restricting member disposed between the bearing member and the frame, wherein the restricting member includes a restricting portion configured to restrict the movement of the second rotary member toward the first rotary member, and wherein, in a state where the first rotary member is supported by the frame and the second rotary member is at the separated position, the restricting member is attachable and detachable between the bearing member and the frame.

DESCRIPTION OF THE EMBODIMENTS

Exemplary embodiments of the present disclosure will be described below with reference to the drawings. Dimensions, materials, shapes, and relative arrangements of components described in the following embodiments can be changed as appropriate based on a configuration of an apparatus to which any of the exemplary embodiments is applied and various conditions, and are not intended to limit the scope of the present disclosure thereto.

<Image Forming Apparatus>

Figure 1:
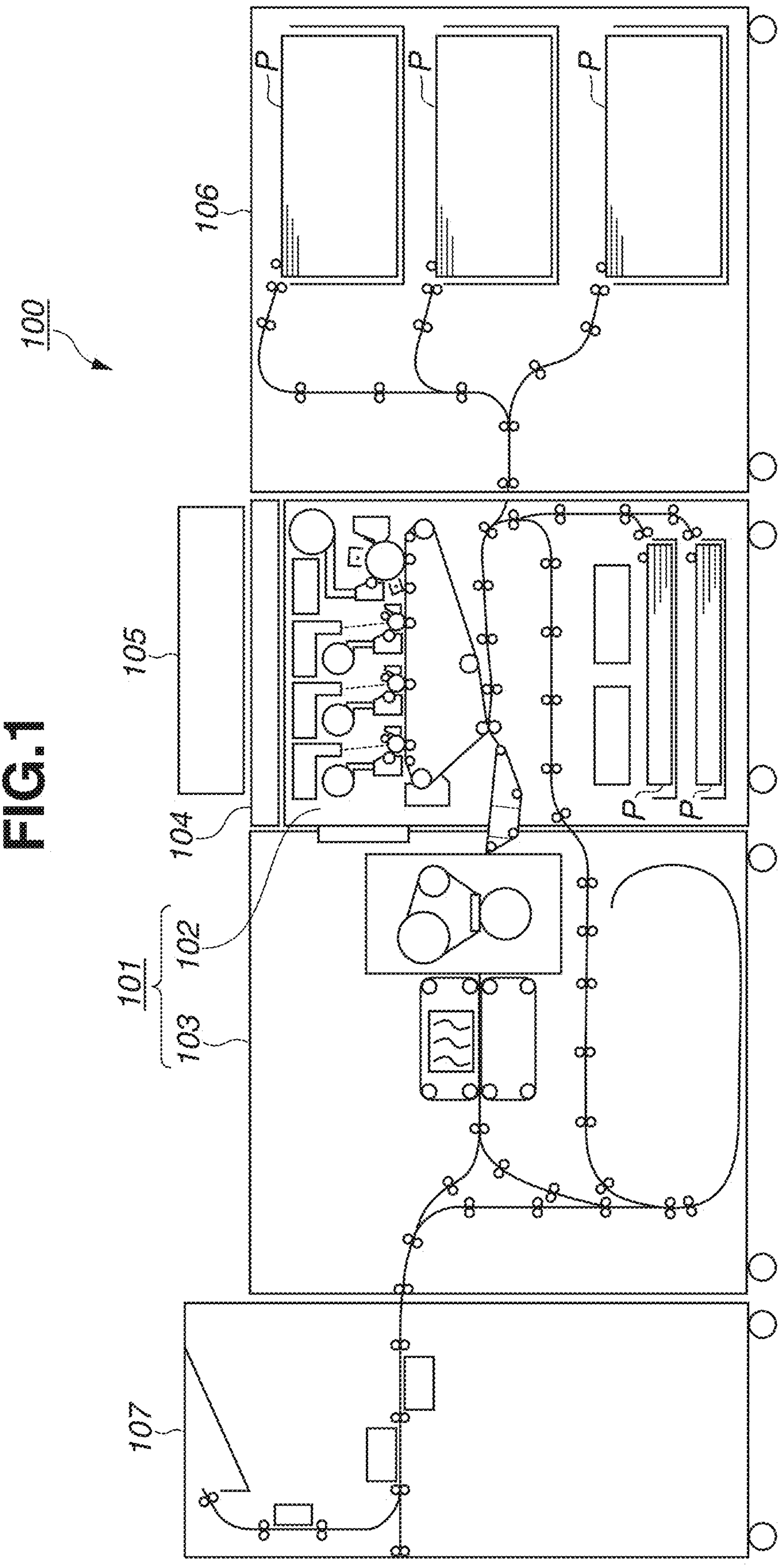
FIG. 1 is a schematic cross-sectional view of an image forming apparatus according to a first exemplary embodiment of the present disclosure.

FIG. 1 is a schematic cross-sectional view of an image forming system 100 including an image forming apparatus 101 according to a first exemplary embodiment of the present disclosure.

The image forming apparatus 101 illustrated in FIG. 1 includes an image forming unit 102 (a first casing) that transfers a toner image to a fed recording material P, and a fixing conveyance unit 103 (a second casing) that fixes the transferred toner image to the recording material P. The image forming unit 102 and the fixing conveyance unit 103 are formed by independent casings. With this configuration, even the image forming apparatus 101 of a large size can be packed and transported in a state where the casings are separated from each other, so that workability in distribution before installation can be improved.

Above the image forming unit 102, a document reader 104 that reads a document image, and a document feeder 105 that feeds a plurality of stacked documents one by one to the document reader 104 are provided and connected to the image forming unit 102.

A feeding apparatus 106 including a plurality of recording material P storage portions is provided upstream of the image forming unit 102 in a conveyance direction of the recording material P.

A sensing apparatus 107 that senses the toner image formed and fixed on one side or both sides of the recording material P is provided downstream of the fixing conveyance unit 103 in the conveyance direction. The sensing apparatus 107 detects a density of the image and a positional displacement of the image and performs feedback correction on an image signal to be transmitted to the image forming unit 102. A post-processing apparatus may be connected to a downstream side of the fixing conveyance unit 103 or a downstream side of the sensing apparatus 107. Examples of the post-processing apparatus include an inserter, a puncher, a case binding machine, a large-volume stacker, a folding machine, a finisher, and a trimmer.

As described above, various optional apparatuses are selectively connected to the image forming apparatus 101 according to the present exemplary embodiment, whereby it is possible to inline-output products obtained by performing various types of post-processing on various kinds of materials. As a result, it is possible to provide the image forming system 100 with high productivity, high image quality, high stability, and high functionality.

<Image Forming Unit>

Figure 2A:
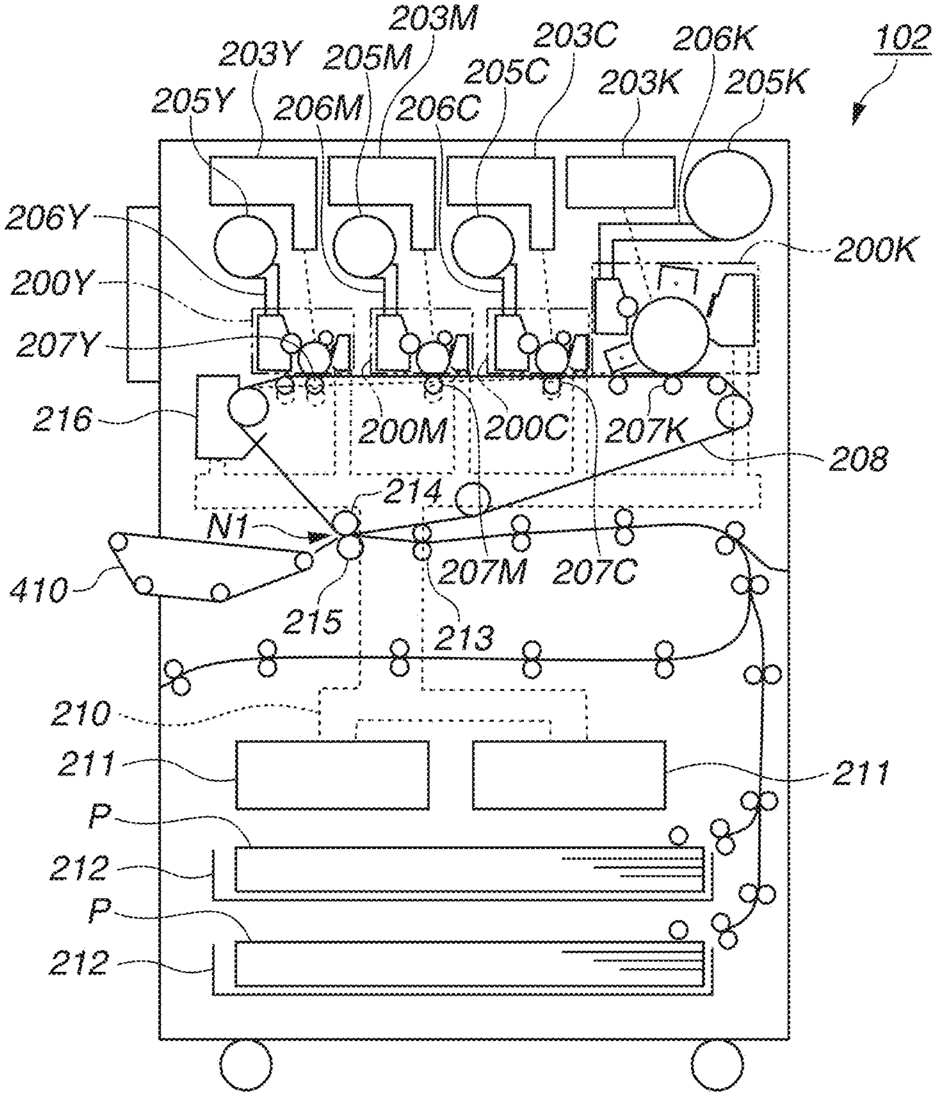
FIGS. 2A, 2B, and 2C are schematic cross-sectional views of an image forming unit according to the first exemplary embodiment.

FIG. 2A is a schematic cross-sectional view of the image forming unit 102 in the image forming apparatus 101 according to the present exemplary embodiment.

Figure 2B:
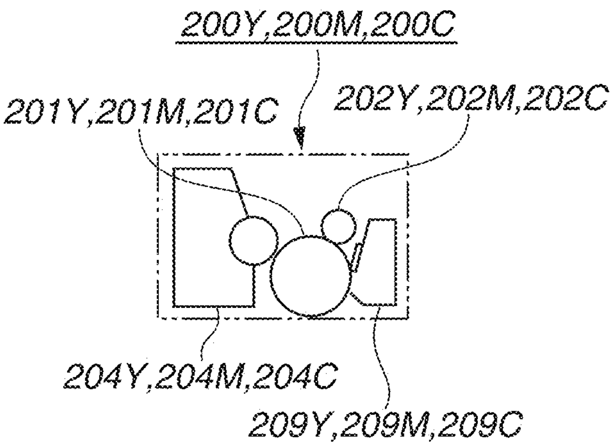
Figure 2C:
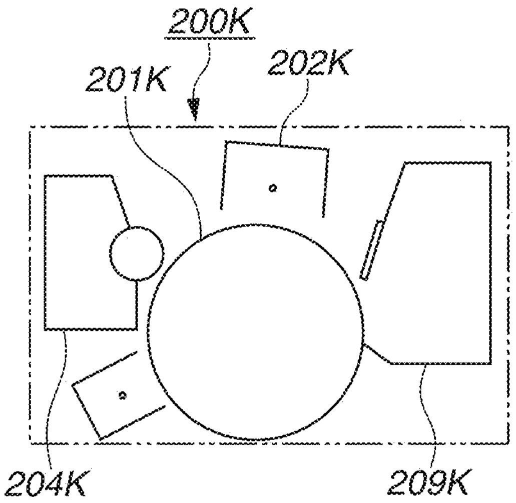

FIG. 2B illustrates image forming stations 200Y, 200M, and 200C for yellow (Y), magenta (M), and cyan (C), respectively, in the image forming unit 102. FIG. 2C illustrates an image forming station 200K for black (K) in the image forming unit 102. The image forming stations 200Y, 200M, 200C, and 200K are also collectively referred to as the image forming stations 200.

The image forming stations 200 will be described. Because the same image forming method is used for the four colors of yellow (Y), magenta (M), cyan (C), and black (K), the description will be given using the image forming station 200Y for yellow (Y) as a representative example.

The surface of a photosensitive drum 201Y in the image forming station 200Y is uniformly charged by a primary charger 202Y, and then an electrostatic latent image is formed on the surface of the photosensitive drum 201Y by a laser scanner 203Y being driven based on a transmitted image information signal. The formed latent image is developed as a toner image by a development device 204Y. The toner corresponding to an amount consumed by the development is appropriately supplied from a toner bottle 205Y to the development device 204Y via a toner supply path 206Y. The toner image on the surface of the photosensitive drum 201Y is transferred onto an intermediate transfer belt 208 with predetermined pressure and electrostatic load bias applied by a primary transfer roller 207Y. After the transfer, a small amount of residual toner on the surface of the photosensitive drum 201Y is removed by a photosensitive drum cleaner 209Y, so that the photosensitive drum 201Y becomes ready for the next image formation. The removed residual toner is stored in toner collection containers 211 via a toner collection path 210. In the image forming stations 200M, 200C, and 200K for magenta (M), cyan (C), and black (K), respectively, the above-described operation is similarly performed, so that the respective toner color images are sequentially transferred onto the intermediate transfer belt 208.

Meanwhile, sheets of the recording material P are fed one by one from one of recording material P storage portions 212 in the image forming unit 102, or one of the recording material P storage portions in the feeding apparatus 106 externally connected to the image forming unit 102. The fed recording material P is then skew-corrected by forming a loop in the recording material P with the leading edge thereof following a nip portion of a registration roller 213. The registration roller 213 then conveys the recording material P to a secondary transfer portion in synchronization with conveyance of a full-color toner image on the intermediate transfer belt 208. A secondary transfer outer roller 215 is pressed against the intermediate transfer belt 208 that is supported from the inner side thereof by a secondary transfer inner roller 214, so that a secondary transfer nip portion N1 is formed between the secondary transfer outer roller 215 and the intermediate transfer belt 208. The toner image on the intermediate transfer belt 208 is transferred onto the recording material P by application of predetermined pressure and electrostatic load bias at the secondary transfer nip portion N1. The secondary transfer inner roller 214, the intermediate transfer belt 208, and the secondary transfer outer roller 215 form the secondary transfer portion serving as a transfer unit according to the present exemplar embodiment. After the transfer, a small amount of residual toner on the intermediate transfer belt 208 is removed by an intermediate transfer belt cleaner 216, so that the intermediate transfer belt 208 becomes ready for the next image formation. The removed residual toner is stored in the toner collection containers 211 via the toner collection path 210. The recording material P to which the toner image has been transferred is conveyed to the fixing conveyance unit 103 located downstream of the image forming unit 102 by a pre-fixing conveyance unit 410.

<Fixing Conveyance Unit>

Figure 3:
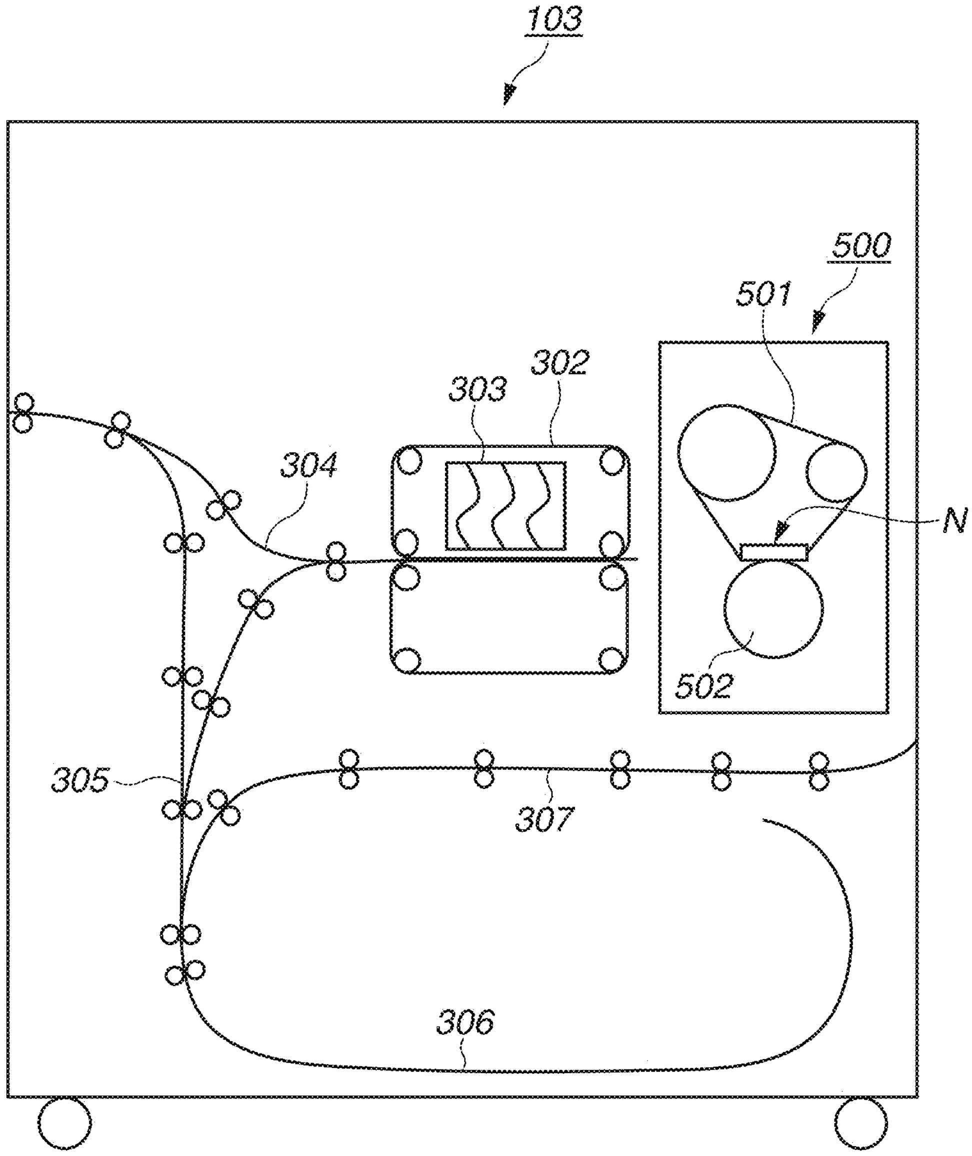
FIG. 3 is a schematic cross-sectional view of a fixing conveyance unit including a fixing device according to the first exemplary embodiment.

FIG. 3 is a schematic cross-sectional view of the fixing conveyance unit 103 in the image forming apparatus 101 according to the present exemplary embodiment. A fixing device 500 illustrated in FIG. 3 includes, as a first rotary member, a fixing belt 501 (a heating rotary member) including a heater inside. The fixing device 500 also includes a pressing roller 502 as a second rotary member.

The pressing roller 502 serving as a pressing rotary member is configured to come into contact with the fixing belt 501 to form a fixing nip portion N (hereinafter referred to as a nip portion N) together with the fixing belt 501. At the nip portion N, heat and pressure are applied to the toner image on the recording material P conveyed from the image forming unit 102 to melt the toner, so that the toner image is fixed to the recording material P. The recording material P heated by the fixing device 500 is cooled by heat absorption of a heat sink 303 disposed inside a cooling device 302. The recording material P is then discharged to the sensing apparatus 107 or a post-processing apparatus (not illustrated) via a sheet discharge conveyance path 304.

In a case where the recording material P is to be discharged after the front and back sides thereof are reversed, the recording material P is switched back and conveyed by a duplex reversing portion 306, so that the recording material P is discharged via a reversing conveyance path 305 and the sheet discharge conveyance path 304 in a state where the leading and trailing edges thereof are switched and the front and back sides thereof are reversed.

In a case where image formation is to be performed on both sides of the recording material P, the recording material P with an image formed on the first side is switched back and conveyed by the duplex reversing portion 306, and is further conveyed to a duplex conveyance path 307 in a state where the leading and trailing edges thereof are switched and the front and back sides thereof are reversed. The recording material P is then conveyed to the registration roller 213 again in synchronization with conveyance timing of the next sheet of the recording material P, so that image formation is performed on the second side using a process similar to that for the first side, and the recording material P is discharged via the sheet discharge conveyance path 304.

As described above, according to the present exemplary embodiment, it is possible to provide the image forming apparatus 101 with high productivity, high image quality, high stability, and long life.

Figure 4:
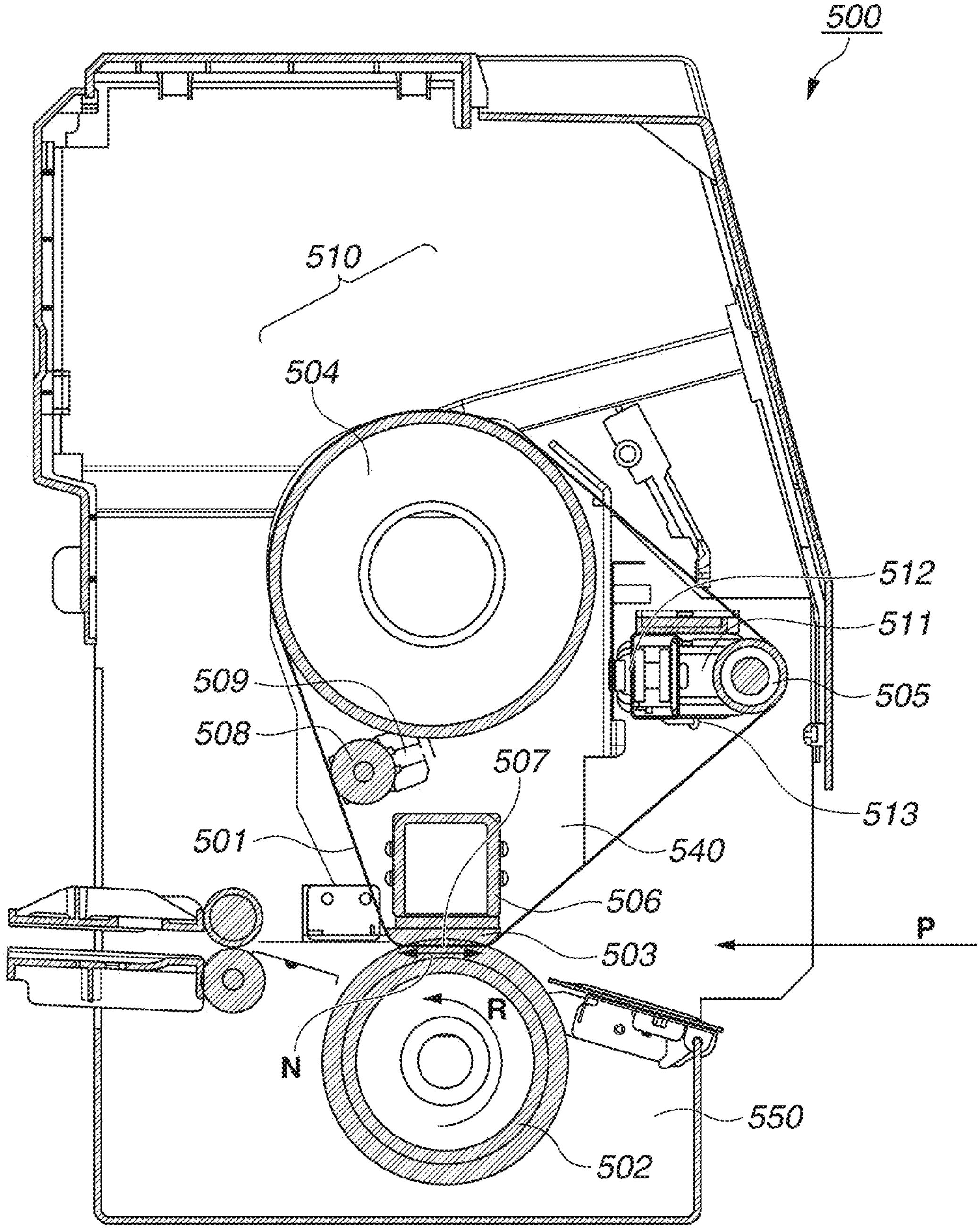
FIG. 4 is a schematic cross-sectional view of the fixing device according to the first exemplary embodiment.

Next, the fixing device 500 according to the present exemplary embodiment will be described in detail with reference to FIG. 4. FIG. 4 is a cross-sectional view of the fixing device 500 according to the present exemplary embodiment.

<Fixing Device>

FIG. 4 schematically illustrates an overall configuration of the fixing device 500 of a belt heating type according to the present exemplary embodiment.

The recording material P is conveyed from right to left in FIG. 4. The fixing device 500 includes a belt unit 510 and the pressing roller 502 serving as a pressing rotary member. The belt unit 510 includes the fixing belt (hereinafter referred to as the belt) 501 as an endless rotatable heating rotary member, a pressing pad (hereinafter referred to as a pad) 503 as a fixing member, a heating roller 504 as a heating unit, and a steering roller 505. The pressing roller 502 serving as a pressing rotary member faces the belt 501 and forms the nip portion N together with the belt 501.

The belt 501 exhibits thermal conductivity and heat resistance, and has a thin cylindrical shape. In the present exemplary embodiment, the belt 501 has a three layer structure including a base layer, an elastic layer on the outer periphery of the base layer, and a release layer on the outer periphery of the elastic layer. The base layer has a thickness of 60 μm and is made of polyimide resin (PI). The elastic layer is made of silicone rubber with a thickness of 300 μm. The release layer has a thickness of 30 μm and is made of tetrafluoroethylene-perfluoroalkoxyethylene copolymer resin (PFA) as a fluororesin. The belt 501 is stretched by the pad 503, the heating roller 504, and the steering roller 505.

The pad 503 is a member that comes into pressure contact with the pressing roller 502 via the belt 501 to form the nip portion N having a predetermined width in the conveyance direction of the recording material P. The pad 503 has a substantially rectangular cross section and is elongated in a width direction of the belt 501. The pad 503 is made of a heat-resistant material, and liquid crystal polymer (LCP) is used as the material.

A lubricating sheet 507 having a surface coated with polytetrafluoroethylene (PTFE) and silicone oil serving as a lubricant are interposed between the pad 503 and the belt 501 so that the belt 501 smoothly slides on the pad 503.

The lubricating sheet 507 is formed by coating the surface of a 70-μm-thick polyimide substrate with PTFE. The lubricating sheet 507 is disposed to improve slidability between the pad 503 and the belt 501. Instead of using the lubricating sheet 507, a coating for improving the slidability can be applied to a surface layer of the pad 503.

An oil supply roller 508 is formed by impregnating, with silicone oil, a roll-shaped member around which a non-woven fabric having a thickness of 100 μm is wound. The oil supply roller 508 is supported by a belt frame 540 (a first frame) of the belt unit 510 so as to be rotatably driven by the belt 501 by being brought into contact with an inner surface of the belt 501 with 3.0 N by a pushing spring 509.

A stay 506 is a rigid reinforcing member that is disposed on the inner side of the pad 503 (the side of the pad 503 opposite to the side thereof on which the lubricating sheet 507 is disposed), backs up the pad 503, and is long in the width direction of the belt 501. As the material thereof, a drawn stainless steel (SUS) 304 material having a thickness of 3 mm is used, and is formed into a hollow shape having a "square" cross section to secure strength. When the pad 503 is pressed by the pressing roller 502, the stay 506 provides strength to the pad 503 to ensure a pressing force at the nip portion N. The material of the stay 506 is not limited to stainless steel as long as the strength can be ensured.

The heating roller 504 is a 1-mm-thick stainless steel pipe with a halogen heater (not illustrated) disposed thereinside and is heatable to a predetermined temperature. The belt 501 is controlled to be heated by the heating roller 504 to a predetermined target temperature corresponding to the type of medium based on a temperature detected by a thermistor. Each end portion of the heating roller 504 is supported by the belt frame 540.

The steering roller 505 suspends the belt 501 while being supported by a steering frame 513. The steering frame 513 rotates about a rotating shaft 512 with respect to the belt frame 540 of the belt unit 510. This causes the steering roller 505 to change alignment with respect to the other suspension members (the pad 503 and the heating roller 504). Accordingly, the position of the belt 501 in a main scanning direction is controlled. The steering roller 505 is biased by a spring 511 supported by the steering frame 513, and also serves as a tension roller for applying a predetermined tension to the belt 501.

The pressing roller 502 includes a shaft, an elastic layer on the outer periphery of the shaft, and a release layer on the outer periphery of the elastic layer. The shaft is made of stainless steel, the elastic layer is made of conductive silicone rubber with a thickness of 5 mm, and the release layer is made of 50-μm-thick PFA as a fluorine resin. The pressing roller 502 is axially supported by a moving mechanism 580 (described below) of the fixing device 500. A gear is fixed to one end portion of the pressing roller 502, and the pressing roller 502 is connected to a driving source M2 (see FIG. 5) via the gear so as to be rotationally driven. The belt 501 is driven to rotate by being nipped between the rotating pressing roller 502 and the pad 503. While the belt 501 is employed as the heating rotary member in the present exemplary embodiment, the same effect can also be obtained by using a roller-shaped heating rotary member.

<Moving Mechanism>

Figure 5:
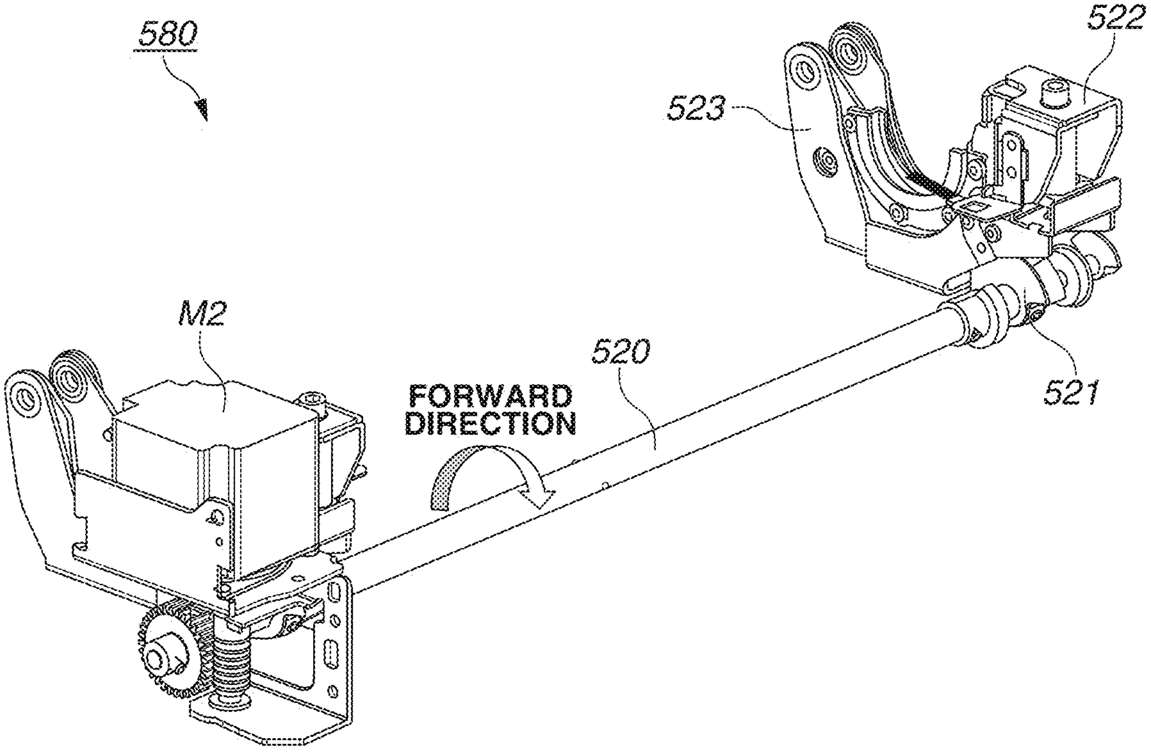
FIG. 5 is a perspective view of a moving mechanism according to the first exemplary embodiment.

FIG. 5 is a perspective view of the driving source M2 and an area near the driving source M2. The driving source M2 switches between a contact state where the belt 501 and the pressing roller 502 are in contact with each other and a separated state where the belt 501 and the pressing roller 502 are separated from each other. The driving source M2 illustrated in FIG. 5 enables a cam shaft 520 to rotate in forward and reverse directions via a gear train. When the driving source M2 rotates the cam shaft 520 in the forward direction (the clockwise direction) in FIG. 5, the pressing roller 502 becomes separated from the belt 501. When the driving source M2 rotates the cam shaft 520 in the reverse direction (the counterclockwise direction), the pressing roller 502 is brought into contact with the belt 501. While worm gears are used in the gear train in the present exemplary embodiment, spur gears or helical gears may be used instead.

A pressing roller pressing cam (hereinafter referred to as a pressing cam) 521 that moves the pressing roller 502 is provided on the cam shaft 520 to which a driving force is input from the driving source M2. The pressing cam 521 rotates with the rotation of the cam shaft 520. In this configuration, the pressing cam 521 is disposed on each of the front and rear sides of the cam shaft 520.

A configuration of the moving mechanism 580 serving as a pressing unit that switches between the contact state where the pressing roller 502 and the belt 501 are in contact with each other and the separated state where the pressing roller 502 and the belt 501 are separated from each other will be described with reference to FIGS. 6A and 6B.

The moving mechanism 580 includes an upper pressing arm 522, a lower pressing arm 523, a pressing spring 524, a pressing cam follower 525, a bearing holder 528, and a pressing screw 529.

The upper pressing arm 522 and the lower pressing arm 523 are communicated by a rotating shaft 526 together with a hole in a pressing frame 550 (a second frame) (see FIG. 4), and are attached so as to be rotatable about the rotating shaft 526 with respect to the pressing frame 550. The upper pressing arm 522 axially supports the pressing roller 502 that includes a bearing 527 as a bearing member at each end portion thereof, using the bearing holder 528. The bearing holder 528 is supported by the pressing frame 550 (the second frame).

The pressing spring 524 is disposed in an elastically compressed state between an end portion of the upper pressing arm 522 and an end portion of the lower pressing arm 523. The pressing spring 524 urges the upper pressing arm 522 and the lower pressing arm 523 in a direction in which a distance between the end portions thereof is increased. A relative movement between the upper pressing arm 522 and the lower pressing arm 523 is restricted by the pressing screw 529 so that the distance between the end portions thereof is a predetermined distance or less. The relative movement in a direction in which the distance between the end portions thereof is decreased is allowed.

Each pressing cam follower 525 is rotatably supported by the lower pressing arm 523 so as to come into contact with the corresponding pressing cam 521.

Each pressing cam 521 has a bottom dead center region 521*a* and a top dead center region 521*b*. While the bottom dead center region 521*a* is in contact with the pressing cam follower 525, the pressing roller 502 is separated from the belt 501. While the top dead center region 521*b* is in contact with the pressing cam follower 525, the pressing roller 502 is in contact with the belt 501.

First, while the fixing process is not performed on the recording material P, the belt 501 and the pressing roller 502 are separated from each other and stand by in a state where the nip is released. At this time, as illustrated in FIG. 6A, the pressing cam follower 525 and the pressing cam 521 are in contact with each other at the bottom dead center region 521*a*. In this state, the distance between the end portions of the upper pressing arm 522 and the lower pressing arm 523 is restricted by the pressing screw 529.

Figure 6B:
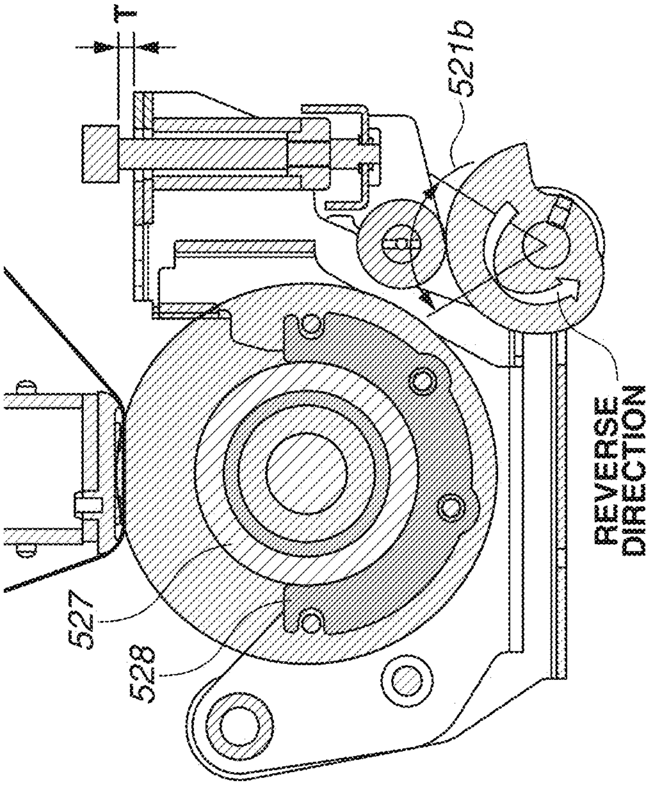
FIGS. 6A and 6B are partial cross-sectional views of a pressing rotary member according to the first exemplary embodiment.
Figure 6A:
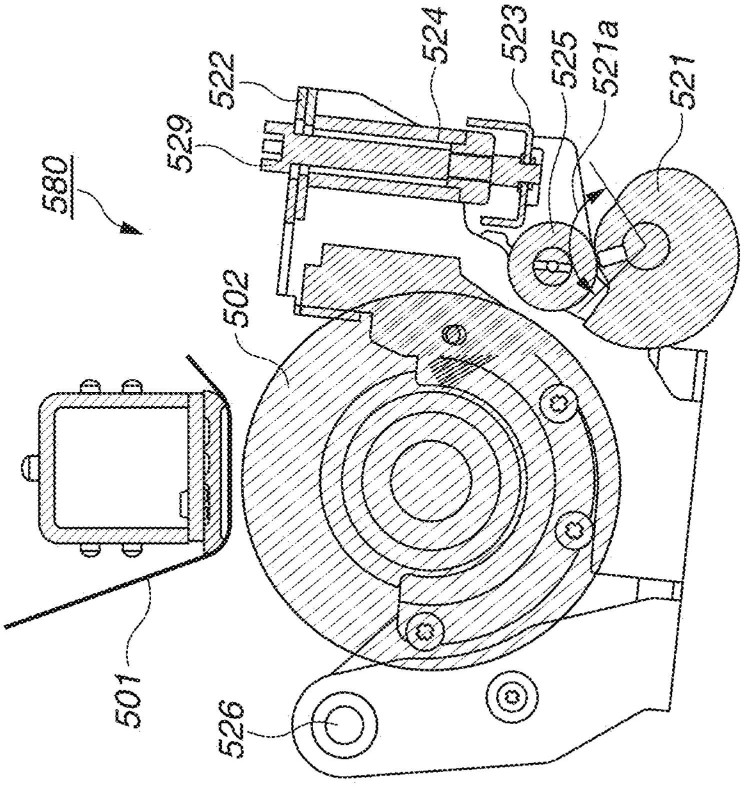

Next, in a case where the fixing process is performed, the driving source (the motor) M2 is driven to rotate the pressing cam 521 in the reverse direction indicated by an arrow in FIG. 6B. When the pressing cam 521 is rotated in the reverse direction, the lower pressing arm 523 is pushed up via the pressing cam follower 525, and the upper pressing arm 522 is also pushed up via the pressing spring 524.

Then, the pressing roller 502 supported by the upper pressing arm 522 comes into contact with the belt 501. When the pressing cam 521 is rotated until the pressing cam 521 comes into contact with the pressing cam follower 525 at the top dead center region 521*b*, the nip portion N is formed between the belt 501 and the pressing roller 502.

At this time, the pressing roller 502 comes into contact with the belt 501, thereby restricting the movement of the upper pressing arm 522, whereas the lower pressing arm 523 relatively moves upward to compress the pressing spring 524 by an amount T. As a result, the upper pressing arm 522 is urged by the pressing spring 524, so that a 1000 N pressing force can be applied to the nip portion N.

The moving mechanism 580 has been described above using an example where the moving mechanism 580 is capable of moving the pressing roller 502 between a contact position where the belt 501 and the pressing roller 502 are in contact with each other and a separated position where the belt 501 and the pressing roller 502 are separated from each other. However, the present exemplary embodiment is not limited to the configuration where the pressing roller 502 can be separated from the belt 501. For example, the moving mechanism 580 may be capable of moving the pressing roller 502 between the contact position where the pressing roller 502 is in contact with the belt 501 and a position where the pressing force is smaller than that at the contact position.

If the pressing roller 502 is left at the contact position, permanent strain is generated in the rubber portion which is press-contacted and deformed, and rotation unevenness or surface property unevenness may occur.

For this reason, while the image forming apparatus 101 is not in use, for example, while the image forming apparatus 101 is transported from a manufacturer to a user, the pressing roller 502 is desirably held in a state (illustrated in FIG. 6A) where the pressing roller 502 has been moved to the separated position.

In the present exemplary embodiment, to maintain the state where the pressing roller 502 has been moved to the separated position, a restricting member 530 illustrated in FIGS. 7A to 8B is attached at the time of distribution before shipment to the user.

<Restricting Member>

Figure 7A:
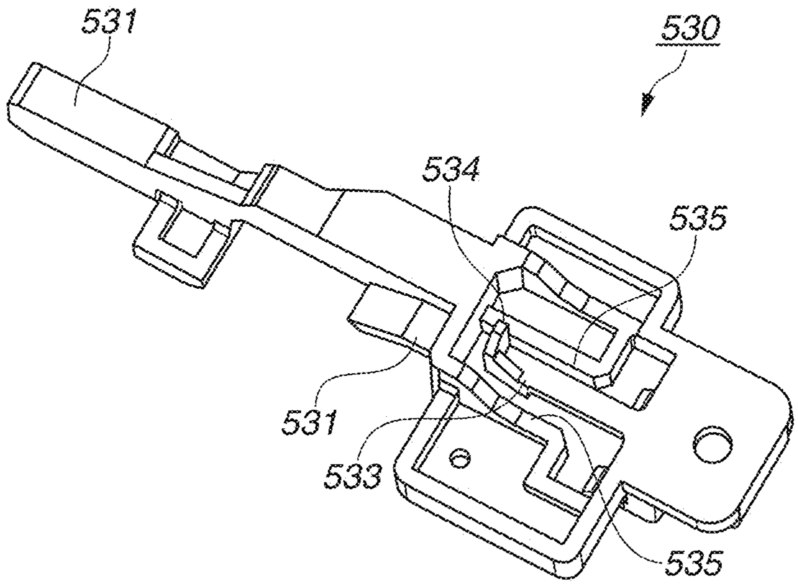
FIGS. 7A and 7B are perspective views of a restricting member according to the first exemplary embodiment.
Figure 7B:
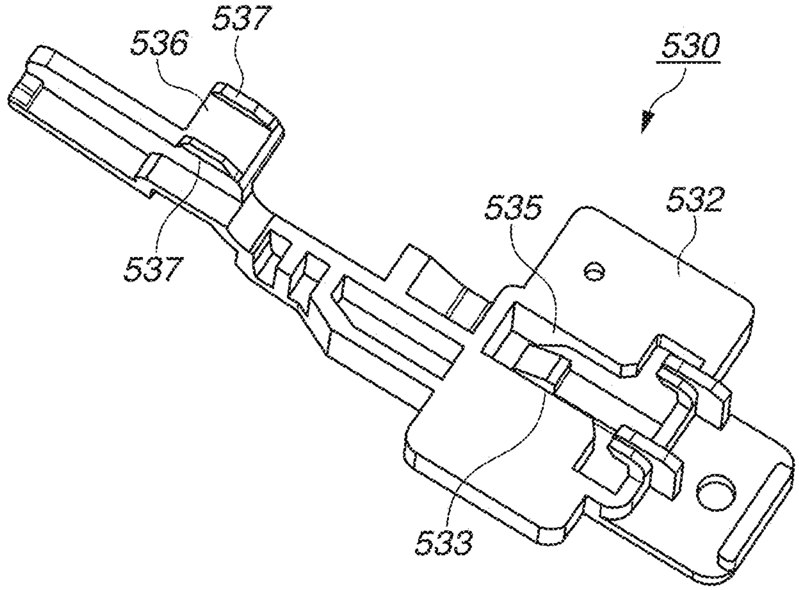

FIG. 7A is a perspective view of the restricting member 530, and FIG. 7B is a view of the restricting member 530 of FIG. 7A as seen from the back side thereof. The restricting member 530 is formed of resin, such as acrylonitrile butadiene styrene (ABS).

Figure 12:
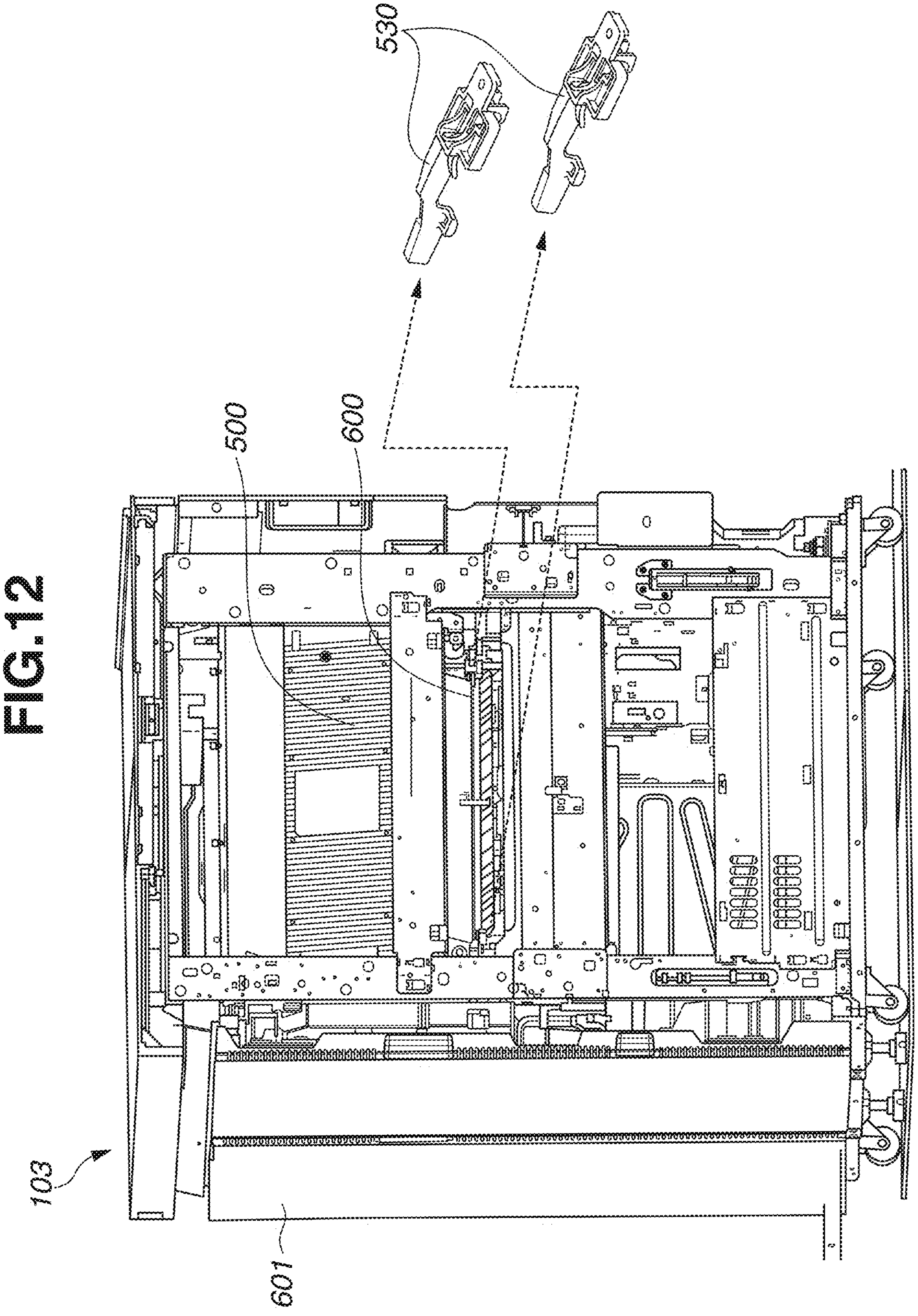
FIG. 12 is a view illustrating another effect of the restricting member according to the first exemplary embodiment.

The restricting member 530 includes a contact portion 531 that comes into contact with the belt frame 540, and an arm contact portion 532 that comes into contact with the upper pressing arm 522. The restricting member 530 also includes an engaging portion 533 that engages with the pressing screw 529 (a to-be-engaged portion), a tab portion 534, a wall portion (a guide portion) 535, a bearing contact portion 536, and a restricting portion 537. The restricting member 530 is attached to each end portion of the fixing device 500. In the present exemplary embodiment, as illustrated in FIG. 12, two restricting members 530 are attached to the fixing device 500.

Figure 8B:
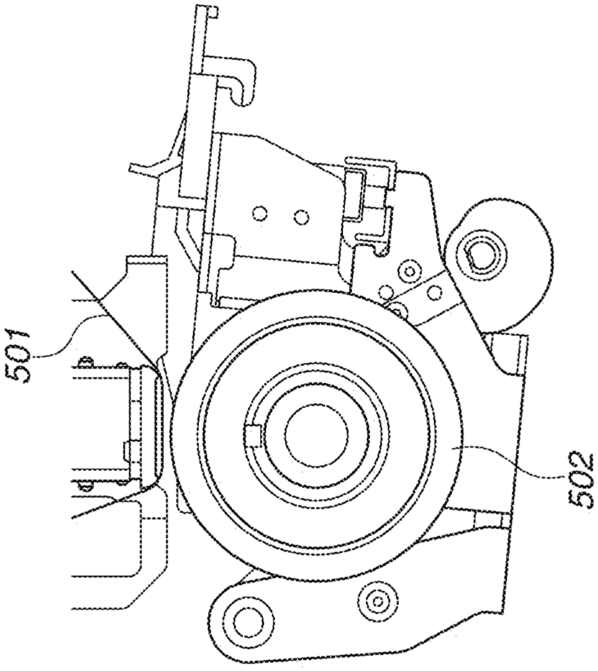
FIGS. 8A and 8B are views illustrating a method for attaching and detaching the restricting member according to the first exemplary embodiment.
Figure 8A:
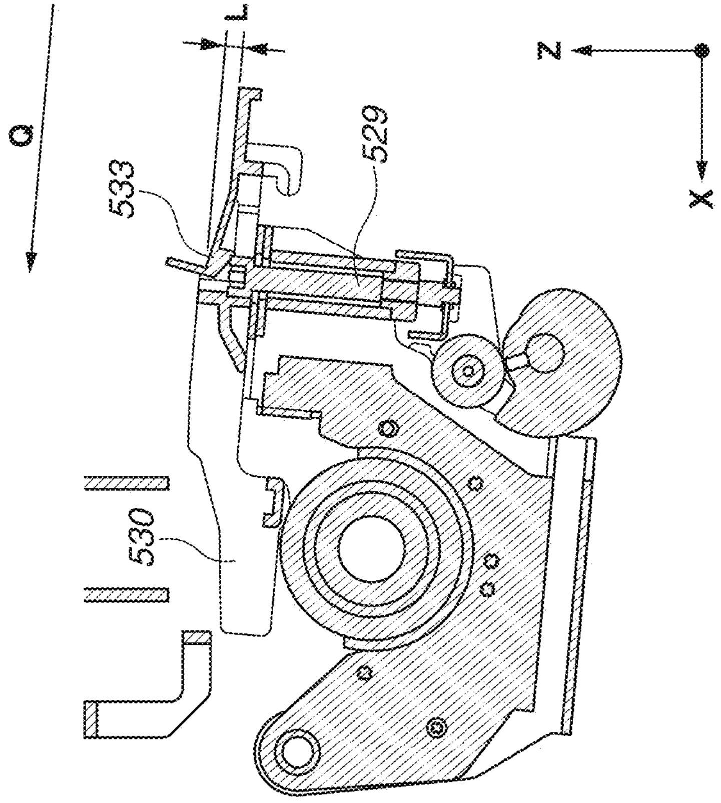
Figure 9A:
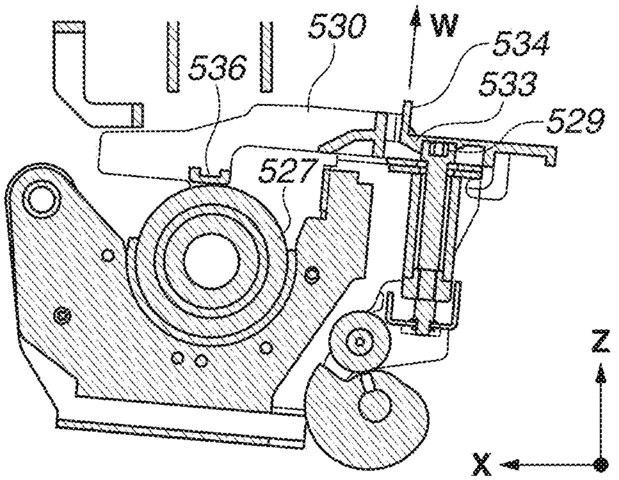
FIGS. 9A, 9B, and 9C are other views illustrating the method for attaching and detaching the restricting member according to the first exemplary embodiment.

When each restricting member 530 is to be attached, as illustrated in FIG. 8A, the restricting member 530 is first moved in a direction indicated by an arrow Q in the separated state. As illustrated in FIG. 8B, there is a clearance between the belt 501 and the pressing roller 502. After being warped by a warp amount L (mm), the engaging portion 533 having a snap-fit shape engages with the pressing screw 529 (the to-be-engaged portion) as illustrated in FIG. 9A, so that the restricting member 530 in the conveyance direction (an X direction in FIGS. 9A to 9C) is positioned. At the same time, the guide portion 535 formed on each side of the engaging portion 533 and the pressing screw 529 are fitted to position the restricting member 530 in a width direction (a Y direction in FIG. 9C), as illustrated in FIG. 9C, which is a view seen from an arrow S direction in FIG. 9B.

When the engaging portion 533 of the restricting member 530 engages with the pressing screw 529 (the to-be-engaged portion), the bearing contact portion 536 formed at an end of the restricting member 530 in the conveyance direction comes into contact with the bearing 527.

Figure 9B:
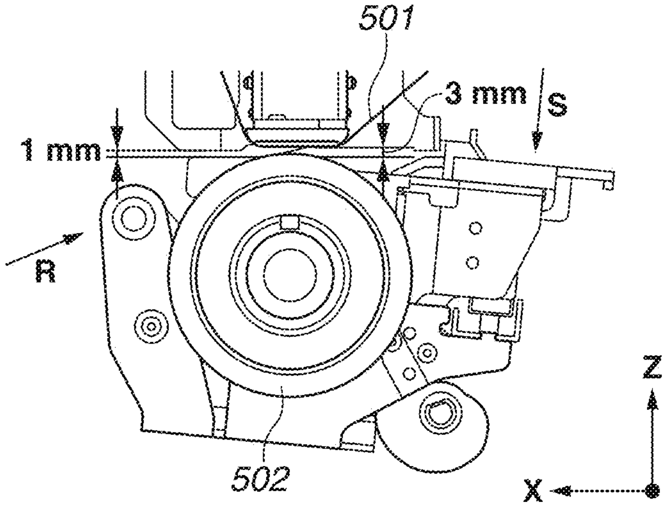
Figure 9C:
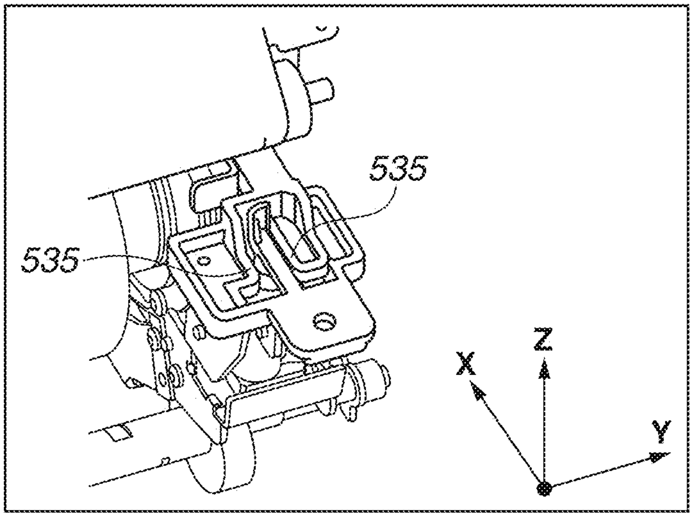
Figure 10:
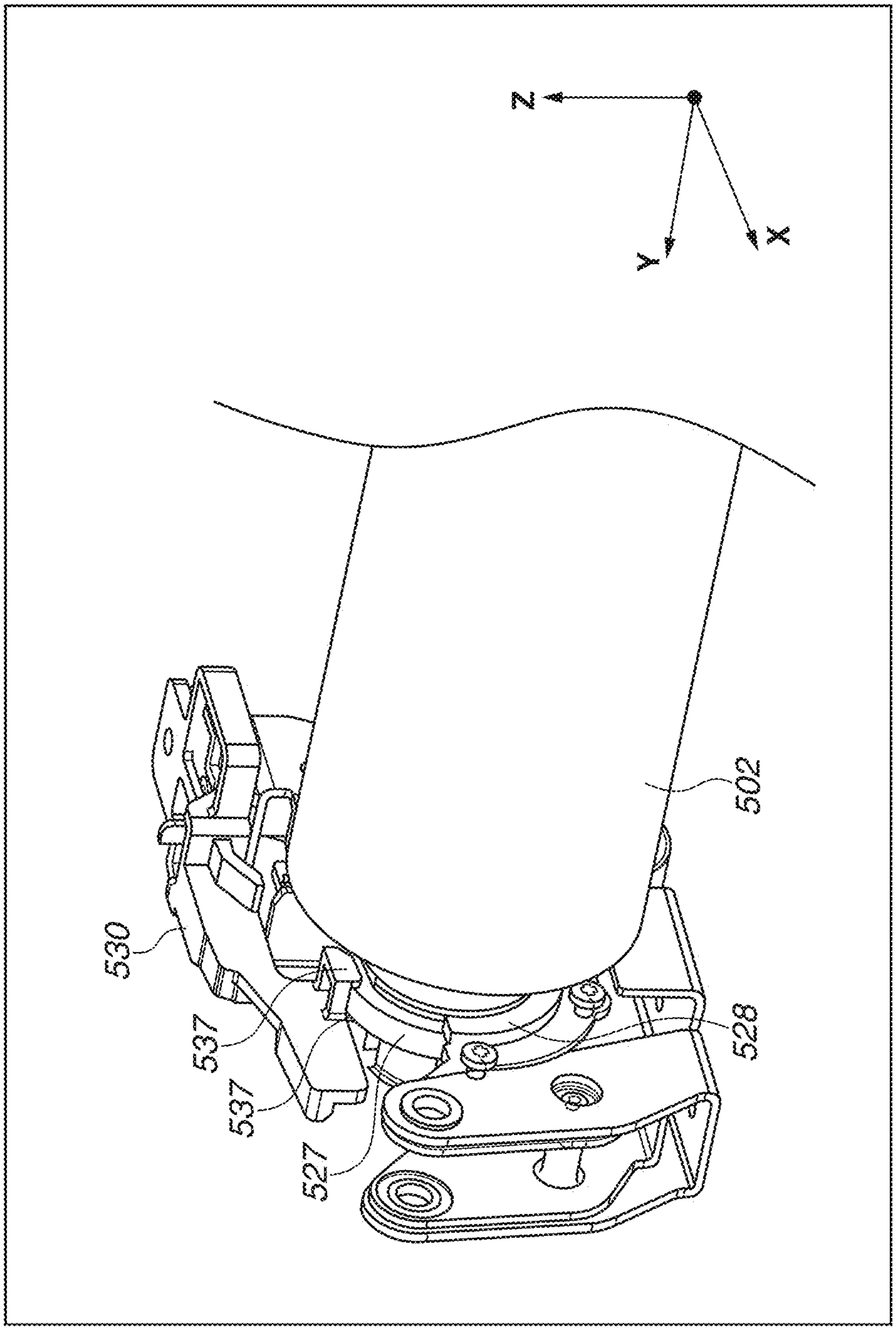
FIG. 10 is a yet another view illustrating the method for attaching and detaching the restricting member according to the first exemplary embodiment.

FIG. 10 is a view seen from an arrow R direction in FIG. 9B. As illustrated in FIG. 10, the restricting portion 537 is formed at each end portion of the bearing contact portion 536. The restricting portion 537 is formed so as to be able to come into contact with both surfaces of the bearing 527 in the width direction of the belt 501. In a case where the restricting member 530 moves in the Y direction, i.e., the width direction due to vibrations, the restricting portion 537 comes into contact with both surfaces of the bearing 527, thereby restricting the movement of the restricting member 530 in the Y direction. The bearing 527 is fitted to and supported by the bearing holder 528 in the conveyance direction (the X direction in FIG. 10) and the width direction (the Y direction in FIG. 10).

As illustrated in FIG. 9B, a clearance between the belt 501 and the pressing roller 502 at this time is 3 mm. A clearance between the contact portion 531 of the restricting member 530 and the belt frame 540 is 1 mm.

Figure 11B:
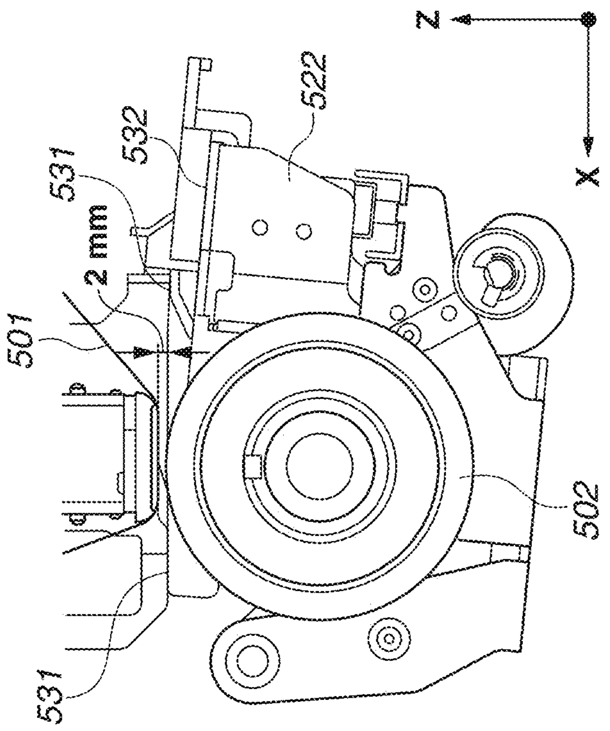
FIGS. 11A and 11B are views illustrating an effect of the restricting member according to the first exemplary embodiment.
Figure 11A:
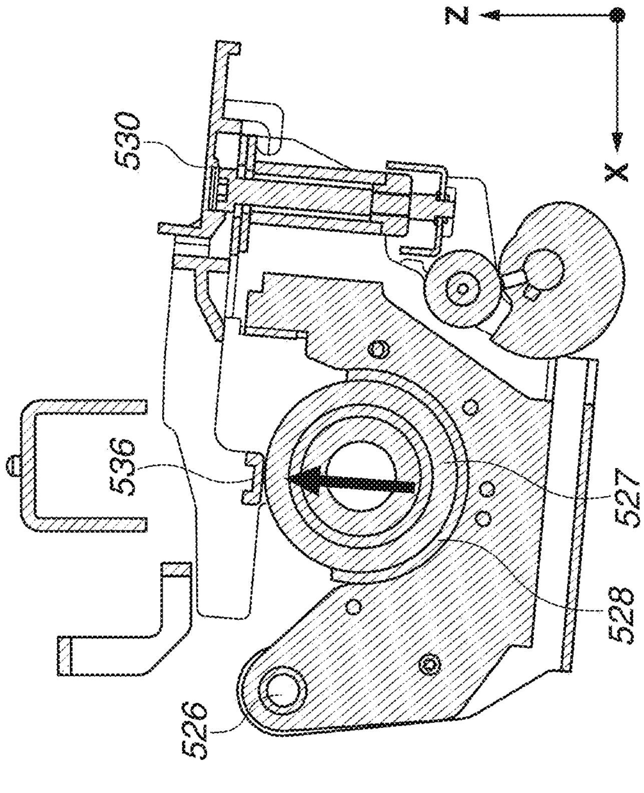

As illustrated in FIGS. 11A and 11B, the bearing 527 is supported by the bearing holder 528, so that the bearing 527 in the conveyance direction (the X direction in FIGS. 11A and 11B) and the width direction (the Y direction in FIG. 10) is positioned. However, the bearing 527 in an upward vertical direction (a Z direction in FIGS. 11A and 11B) is not positioned. Thus, if vibrations are randomly applied to the pressing roller 502 during transportation of the fixing device 500, the pressing roller 502 can be moved in the upward vertical direction. At the same time, if vibrations are also randomly applied to the upper pressing arm 522, the upper pressing arm 522 can rotate about the rotating shaft 526 in the Z direction.

To address the issue, the image forming apparatus 101 according to the present exemplary embodiment is transported in a state where the restricting member 530 is attached to the fixing device 500. Accordingly, even when the pressing roller 502 moves in the upward vertical direction, the bearing contact portion 536 and the arm contact portion 532 of the restricting member 530 are in contact with the bearing 527 and the upper pressing arm 522, respectively. Thus, the pressing roller 502 is lifted in the Z direction via the bearing 527 and the upper pressing arm 522, but the movement of the pressing roller 502 in the Z direction toward the belt 501 is restricted at a position where the contact portion 531 of the restricting member 530 comes into contact with the belt frame 540. As described above, since the restricting member 530 can restrict the movement of the pressing roller 502 in the upward vertical direction, it is possible to prevent the pressing roller 502 and the belt 501 from coming into contact with each other.

As illustrated in FIG. 11B, when the pressing roller 502 vibrates in the Z direction, a clearance of 1 mm between the contact portion 531 of the restricting member 530 and the belt frame 540 disappears, but a clearance of 2 mm between the belt 501 and the pressing roller 502 can be secured. Therefore, it is possible to avoid contact between the belt 501 and the pressing roller 502 during the distribution.

The restricting member 530 is attachable to and detachable from the fixing device 500 in the separated state where the belt 501 and the pressing roller 502 are separated from each other. While the restricting member 530 is detached from the fixing device 500, the pressing roller 502 is movable to the contact position where the pressing roller 502 is in contact with the belt 501.

As described above, the restricting member 530 restricts the vibrations of the upper pressing arm 522 and the bearing 527 during the distribution and secures the clearance between the belt 501 and the pressing roller 502, thereby preventing the pressing roller 502 from coming into contact with the belt 501 and damaging the belt 501.

As described above, in the present exemplary embodiment, the image forming unit 102 and the fixing conveyance unit 103 are formed by independent casings. Thus, as illustrated in FIG. 12, a right side surface of the fixing conveyance unit 103 has an opening portion 600 for receiving and sending the recording material P from and to the image forming unit 102. The fixing device 500 is also disposed on the right side surface side in order to receive and send the recording material P from and to the image forming unit 102. Thus, the restricting member 530 can be detached from the right side surface side of the fixing conveyance unit 103, and a front door 601 of the fixing conveyance unit 103 is not opened or closed. Therefore, it is also possible to significantly reduce the work time taken to detach the restricting member 530 at an installation site after completion of the transportation.

Further, as illustrated in FIG. 9A, pulling the tab portion 534 in a direction indicated by an arrow W enables releasing the engagement with the pressing screw 529. Thus, a screw for fixing the restricting member 530 is unnecessary.

Figure 13B:
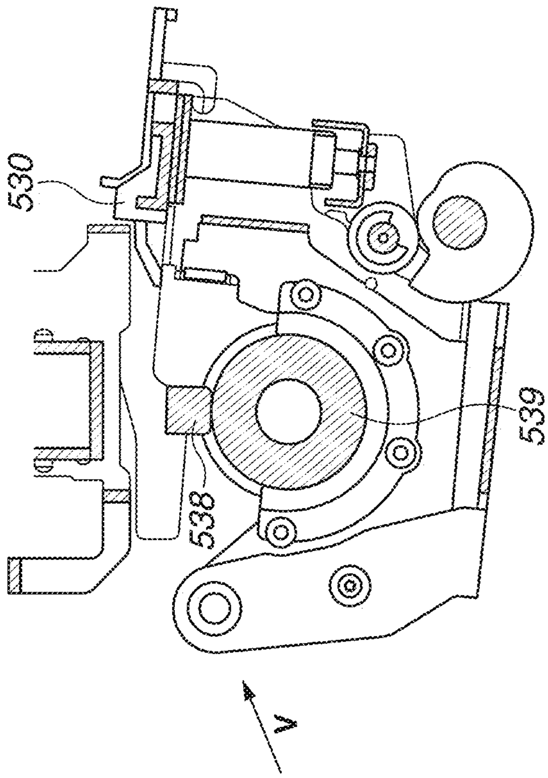
FIGS. 13A and 13B are views illustrating a restricting member according to one or more embodiments of the present disclosure.
Figure 13A:
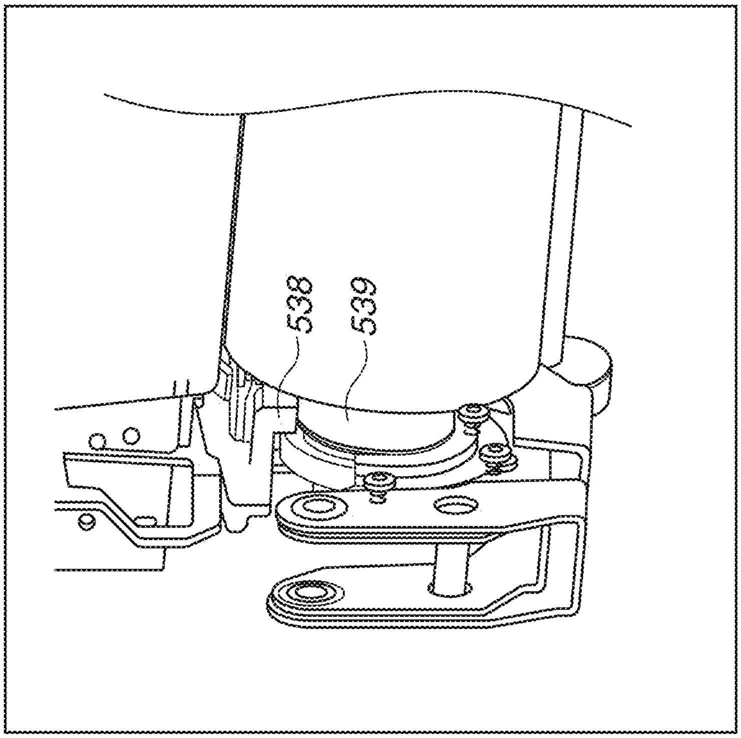

In the present exemplary embodiment, the configuration has been described in which the bearing contact portion 536 and the arm contact portion 532 of the restricting member 530 come into contact with the bearing 527 and the upper pressing arm 522, respectively, to avoid contact between the belt 501 and the pressing roller 502. The present disclosure is, however, not limited to the present exemplary embodiment. As illustrated in FIGS. 13A and 13B, in one or more embodiments, the restricting member 530 may include a journal contact portion 538, and the journal contact portion 538 may come into contact with a journal 539 of the pressing roller 502 to avoid contact between the belt 501 and the pressing roller 502.

The restricting member 530 according to the above-described exemplary embodiment is attached to the fixing device 500 before the fixing device 500 is transported. After the fixing device 500 is delivered to the user, the restricting member 530 is detached from the fixing device 500.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154395, filed Sep. 28, 2022, which is hereby incorporated by reference herein in its entirety.

What is claimed is:

1. A fixing device comprising:

a heating unit configured to heat a recording material and including a first rotary member;

a second rotary member configured to rotate and to come into contact with the first rotary member to form a nip portion, wherein, at the nip portion and together with the first rotary member, the second rotary member applies heat and pressure to the recording material bearing a toner image to fix the toner image to the recording material;

a frame supporting each end portion of the heating unit and configured to support the first rotary member;

a bearing member attached to each end portion of the second rotary member and supported by the frame so as to rotatably support the second rotary member;

a moving mechanism configured to move the second rotary member between a contact position at which the first rotary member and the second rotary member are in contact with each other and form the nip portion and a separated position at which the first rotary member and the second rotary member are separated from each other; and a restricting member disposed between the bearing member and the frame, wherein the restricting member includes a restricting portion configured to restrict the movement of the second rotary member toward the first rotary member, and wherein, in a state where the first rotary member is supported by the frame and the second rotary member is at the separated position, the restricting member is attachable and detachable between the bearing member and the frame.

2. The fixing device according to claim 1, wherein the restricting member is attached in a conveyance direction of the recording material.

3. The fixing device according to claim 1, wherein, in a state where the restricting member is attached between the bearing member and the frame, a clearance between the restricting member and the frame is smaller than a clearance between the first rotary member and the second rotary member.

4. The fixing device according to claim 1, wherein the restricting member is attached to the moving mechanism.

5. The fixing device according to claim 4, wherein the restricting member further includes an engaging portion configured to engage with the moving mechanism, wherein the moving mechanism includes a to-be-engaged portion configured to be engaged with the engaging portion, and wherein the engagement of the engaging portion and the to-be-engaged portion restricts movement of the restricting member in a conveyance direction of the recording material.

6. The fixing device according to claim 1, wherein, in a state where the restricting member is detached from between the bearing member and the frame, the second rotary member is movable from the separated position to the contact position.

7. An image forming apparatus comprising:

the fixing device according to claim 1;

an image forming unit configured to form the toner image on the recording material;

a first casing configured to accommodate the image forming unit; and a second casing configured to accommodate the fixing device, wherein the second casing is disposed downstream of the first casing in a conveyance direction of the recording material, and wherein, in a state where the fixing device is accommodated in the second casing, the restricting member is attachable between the bearing member and the frame.

8. The image forming apparatus according to claim 7, wherein the restricting member is attachable between the bearing member and the frame from an upstream side toward a downstream side in the conveyance direction of the recording material.

* * * * *